(12) United States Patent
Munthe

(10) Patent No.: US 12,500,249 B2
(45) Date of Patent: Dec. 16, 2025

(54) MEMBRANE ELECTRODE ASSEMBLY, FUEL CELL STACK WITH MEMBRANE ELECTRODE ASSEMBLY AND ALIGNMENT TOOL FOR FUEL CELL STACK

(71) Applicants: POWERCELL SWEDEN AB, Gothenburg (SE); Stefan Munthe, Västra Frölunda (SE)

(72) Inventor: Stefan Munthe, Västra Frölunda (SE)

(73) Assignee: POWERCELL SWEDEN AB, Gothenburg (SE)

( * ) Notice: Subject to any disclaimer, the term of this patent is extended or adjusted under 35 U.S.C. 154(b) by 0 days.

(21) Appl. No.: 17/251,246

(22) PCT Filed: Jun. 18, 2019

(86) PCT No.: PCT/SE2019/050576
§ 371 (c)(1),
(2) Date: Dec. 11, 2020

(87) PCT Pub. No.: WO2020/005138
PCT Pub. Date: Jan. 2, 2020

(65) Prior Publication Data
US 2021/0249669 A1    Aug. 12, 2021

(30) Foreign Application Priority Data
Jun. 26, 2018 (SE) .................................. 1850787-1

(51) Int. Cl.
*H01M 8/04* (2016.01)
*H01M 8/0297* (2016.01)
(Continued)

(52) U.S. Cl.
CPC ....... *H01M 8/0297* (2013.01); *H01M 8/1004* (2013.01); *H01M 8/2404* (2016.02); *H01M 8/241* (2013.01)

(58) Field of Classification Search
CPC . H01M 8/2404; H01M 8/0247; H01M 8/0297
See application file for complete search history.

(56) References Cited

U.S. PATENT DOCUMENTS

| | | | |
|---|---|---|---|
| 6,423,439 B1 | 7/2002 | Barton et al. | |
| 6,524,452 B1 * | 2/2003 | Clark | C25B 15/08 |
| | | | 429/513 |

(Continued)

FOREIGN PATENT DOCUMENTS

| | | |
|---|---|---|
| CN | 101295799 A | 10/2008 |
| CN | 105655609 A | 6/2016 |

(Continued)

OTHER PUBLICATIONS

Swedish Search Report (Nov. 20, 2018) for corresponding Swedish App. 1850787-1.

(Continued)

*Primary Examiner* — Olatunji A Godo
(74) *Attorney, Agent, or Firm* — Muncy, Geissler, Olds & Lowe, P.C.

(57) ABSTRACT

A membrane electrode assembly for a fuel cell stack includes at least a cathode, an anode and a membrane therebetween, wherein the membrane electrode assembly further has a basic shape which substantially resembles the shape of a bipolar plate of a fuel cell unit onto which the membrane electrode assembly is intended to be placed, wherein the membrane electrode assembly further includes at least one distinctive alignment projection, which protrudes from a circumference of the basic shape and wherein the distinctive alignment projection has a size and/or shape which is adapted to be contacted by an alignment tool for aligning the membrane electrode assembly in the fuel cell stack, as well as a fuel cell stack including such a membrane (Continued)

electrode assembly and an alignment tool or fuel cell stack housing for aligning and/or housing such a fuel cells stack.

20 Claims, 2 Drawing Sheets

(51) Int. Cl.
  *H01M 8/1004* (2016.01)
  *H01M 8/2404* (2016.01)
  *H01M 8/241* (2016.01)

(56) References Cited

U.S. PATENT DOCUMENTS

| | | | |
|---|---|---|---|
| 2003/0127806 A1* | 7/2003 | Belchuk | H01M 8/1007 |
| | | | 277/609 |
| 2006/0046131 A1* | 3/2006 | Frank | H01M 8/242 |
| | | | 429/480 |
| 2007/0042255 A1* | 2/2007 | Jung | H01M 8/0276 |
| | | | 429/457 |
| 2007/0238004 A1 | 10/2007 | Osenar et al. | |
| 2009/0269648 A1* | 10/2009 | Cha | H01M 8/0247 |
| | | | 429/494 |
| 2011/0207024 A1* | 8/2011 | Bogumil | H01M 8/0297 |
| | | | 429/514 |
| 2012/0260498 A1* | 10/2012 | Rober | H01M 8/247 |
| | | | 29/730 |
| 2013/0071772 A1* | 3/2013 | Belchuk | H01M 8/0286 |
| | | | 429/535 |
| 2015/0132678 A1 | 5/2015 | Hood | |
| 2016/0049670 A1 | 2/2016 | Tanahashi et al. | |
| 2018/0145365 A1 | 5/2018 | Jin et al. | |

FOREIGN PATENT DOCUMENTS

| | | |
|---|---|---|
| CN | 107046142 A | 8/2017 |
| DE | 102015218757 A1 | 3/2017 |
| DE | 102015223640 A | 6/2017 |
| JP | 200048849 | 2/2000 |
| JP | 2005100807 A | 4/2005 |
| JP | 2006012789 A | 1/2006 |
| JP | 2006156176 | 6/2006 |
| JP | 2006269233 A | 10/2006 |
| JP | 200766573 | 3/2007 |
| JP | 2008235159 * | 10/2008 |
| JP | 2011003377 A | 1/2011 |
| JP | 2015125941 A | 7/2015 |
| KR | 100875579 B1 | 12/2008 |
| KR | 20090089728 A | 8/2009 |

OTHER PUBLICATIONS

International Search Report (Oct. 4, 2019) for corresponding International App. PCT/SE2019/050576.
Korean Official Action (Jan. 6, 2023) for corresponding Korean App. 10-2020-7034937.
Japanese Official Action (Oct. 29, 2021) for corresponding JP App. 2020-570492.
Japanese Official Action (May 16, 2023) for corresponding Japanese App. 2020-570492.
Korean Official Action (Jul. 27, 2023) for corresponding Korean App. 10-2020-7034937.
Indian Official Action (Dec. 30, 2021) for corresponding Indian Application 202027056130.
Chinese Official Action (Mar. 23, 2024) for corresponding Chinese App. 201980042154.8.
Chinese Official Action (Nov. 1, 2024) for corresponding Chinese App. 201980042154.8.
Chinese Official Action (Mar. 10, 2025) for corresponding Chinese App. 201980042154.8.

* cited by examiner

MEMBRANE ELECTRODE ASSEMBLY, FUEL CELL STACK WITH MEMBRANE ELECTRODE ASSEMBLY AND ALIGNMENT TOOL FOR FUEL CELL STACK

BACKGROUND AND SUMMARY

The present invention relates to a membrane electrode assembly, a fuel cell stack with such a membrane electrode assembly as well as to an alignment tool for a fuel cell stack.

A fuel cell stack usually comprises two monopolar plates between which a plurality of membrane electrode assemblies is arranged, which in turn are separated by bipolar plates. The membrane electrode assembly (MEA) itself comprises at least a cathode, an anode and a membrane therebetween, for reacting hydrogen and oxygen, to electric energy and water. For providing the reactants (hydrogen and oxygen) to the respective electrodes, the bipolar plates arranged at both sides of the MEA have a fluid flow field which guides the reactants' fluid flow to the respective electrodes.

Since the reaction in a single MEA typically produces insufficient voltage for operating most applications, a plurality of the MEAs is stacked and electrically connected in series to achieve a desired voltage. Electrical current is collected from the fuel cell stack and used to drive a load.

The efficiency of the fuel cell stack depends on the flow of reactants across the surfaces of the MEA as well as the integrity of the various contacting and sealing interfaces within individual fuel cells of the fuel cell stack. Such contacting and sealing interfaces include those associated with the transport of fuels, coolants, and effluents within and between fuel cells of the stack. Consequently, proper positional alignment of fuel cell components and assemblies within a fuel cell stack is critical to ensure efficient operation of the fuel cell system.

For aligning and stacking, usually an alignment tool, as for example an alignment framework having at least one guiding element, is used, which ensures a predefined arrangement of the MEAs and bipolar plates during the stacking process. After the desired amount of MEAs and bipolar plates has been stacked, the resulting fuel cell stack is compressed, e.g. screwed together or otherwise bonded, so that the fuel cell stack can be used in the desired application.

For ensuring a proper alignment of the MEAs and the bipolar plates it has been proposed in the state of the art, to provide both MEA and bipolar plate with alignment features such as recesses into which the guiding elements of the alignment framework may be inserted or incorporated.

The disadvantage of the known alignment is that both MEA and bipolar plates have to be provided with the respective alignment features, which is very costly, and only very narrow tolerances in the manufacture of MEAs and bipolar plates are allowable. Additionally, the stacking process is very time consuming and in case only a single bipolar plate or MEA is not properly aligned, the complete stack has to be dismissed.

Another disadvantage of the known fuel cell units it that due to the necessity of proper alignment, and due to the fact that the MEA is flexible and therefore easily bended, the MEA needs to be stabilized by the adjacent bipolar plates. Therefore, it is required that the size and shape of the MEA is adapted to the size and shape of the bipolar plate. This in turn results in the risk of short circuits due to contacting bipolar plates, in case the MEA does not extend till the outer circumference of the sandwiching bipolar plates.

It is desirable to provide a membrane electrode assembly, a fuel cell stack and an alignment tool which allows for an accurate alignment of the components of the fuel cell stack and simultaneously reduces the risk of short circuits due to contacting bipolar plates.

In the following a membrane electrode assembly for a fuel cell stack is proposed which comprises at least a cathode, an anode and a membrane therebetween. The membrane electrode assembly further has a basic shape which substantially resembles the shape of a bipolar plate of a fuel cell unit onto which the membrane electrode assembly is intended to be placed. Instead of providing a recess for receiving an alignment tool, e.g. a guiding rod, or a distinct place where the alignment tool may contact the bipolar plate, for allowing a proper alignment of the membrane electrode assembly with the bipolar plate, the inventor has surprisingly found that in case the membrane electrode assembly is provided with a distinctive alignment projection which significantly protrudes from a circumference of the basic shape of the membrane electrode assembly, this alignment projection may be used for aligning the fuel cell stack components. This is due to the fact, that in case the distinctive alignment projection is adapted to be contacted by an alignment tool, e.g. by being not too big or being specifically shaped, the alignment projection provides a sufficient rigidity for a proper alignment. Thereby the rigidity may even be enhanced if the membrane electrode assembly is fastened to the corresponding bipolar plate before the stacking and alignment process. Then the membrane electrode assembly is stabilized by the bipolar plate and the alignment projection may be used for aligning the membrane electrode assembly—bipolar plate—complex. It should be noted that the alignment tool may also be the housing of the fuel cell stack itself. Consequently, in the following alignment tool may be a separate alignment tool or a fuel cell stack housing which integrally comprises the alignment tool structure and function.

This arrangement also allows for a size of the membrane electrode assembly to extend over the size of the corresponding bipolar plate since for the alignment it is no necessary to contact the bipolar plate any more. Thereby, the risk of a short circuit due to contacting bipolar plates is avoided as the membrane electrode assembly acts as insulation between them. Since the membrane electrode assembly extends over the bipolar plate in all places, such an insulation is in all cases ensured.

According to a further preferred embodiment, the membrane electrode assembly comprises at least two distinctive alignment projections. Thereby, the alignment accuracy may be increased. Moreover, in case the membrane electrode assembly has preferably two or more alignment projections which are, in addition, distributed asymmetrically along the circumferences of the membrane electrode assembly, it is even possible to ensure a specific electric orientation of the membrane electrode assembly during the stacking. Thereby, it may be ensured that the cathodes side of the membrane electrode assembly contacts the cathode side of the bipolar plate and the anode side of the membrane electrode assembly contacts the anodes side of the bipolar plate. Alternatively or additionally, this ensures that, in case the membrane electrode assembly and the bipolar plate are preassembled, the membrane electrode assembly always contacts the bipolar plate of the adjacent fuel cell unit and not the membrane electrode assembly of the adjacent fuel cell unit. Consequently, the risk of manufacturing imperfections due to misalignment of both incorrect spatial orientation or incorrect electrical orientation may be reduced or even completely avoided.

According to a further preferred embodiment, the at least two alignment projections have a different shape and/or size. A proper alignment may then be ensured even in an automated process as the alignment projections only fit into their corresponding recesses in the alignment tool. Additionally, this also avoids the risk of manufacturing imperfections due to misalignment of both incorrect spatial orientation or incorrect electrical orientation.

According to a further aspect, the invention relates to an alignment tool for aligning the membrane electrode assembly in a fuel cell stack. Preferably, the alignment tool has at least one element, e.g. a wall element, having at least one recess, which is adapted to accommodate the distinctive alignment projection of the membrane electrode assembly. Thereby, the shape and/or size of the recess is preferably adapted to the shape and/or size of the corresponding alignment projection.

This allows for a correct alignment of the membrane electrode assembly and ultimately, in case the membrane electrode assembly is preassembled with a bipolar plate to form a fuel cell unit, for a correct alignment of the fuel cell units in the fuel cell stack.

A further aspect of the invention relates to a fuel cell stack comprising at least one membrane electrode assembly as discussed above, which preferably has been aligned by means of the alignment tool, as disclosed above. Alternatively, the fuel cell stack may be comprised in a housing which acts as both alignment tool and accommodation, and hence also comprises the above discussed features of the alignment tool.

According to a further preferred embodiment, the fuel cell stack comprises a plurality of pre-assembled fuel cell units, wherein each pre-assembled fuel cell unit is a preassembly of a membrane electrode assembly which has been fastened to a bipolar plate at one of its sides. This pre-assembly allows for a simplified handling of the fuel cell units during the stacking process and, in addition, reinforces the rigidity of the membrane electrode assembly. This in turn helps avoiding any bending and subsequent misalignment of membrane electrode assembly during the stacking process.

Furthermore, the preassembly ensures that the spatial orientation of the components of the pre-assembled fuel cell unit is preserved. Additionally, since the membrane electrode assembly is only arranged on one side of the bipolar plate the stacking procedure is facilitated and may be based on the spatial orientation of the membrane electrode assemblies, only. This is due to the fact that the rigidity of the bipolar plate enforces the rigidity of the membrane electrode assembly to such an extent, that the membrane electrode assembly alone may be used as basis for the alignment of the fuel cell units. The bipolar plate itself may be completely disregarded for the alignment of the fuel cell stack.

The reinforced rigidity of the membrane electrode assembly due to the preassembly with the bipolar plate has the further advantage that, even softer materials may be used for the membrane electrode assembly and/or the membrane electrode assembly may be made thinner, which allows for use of materials providing a higher electricity yield and/or the stacking of more fuel cell units into a stack having the same dimensions as the known fuel cell stacks.

According to another preferred embodiment, the membrane electrode assemblies of the fuel cell stack may extend over the bipolar plates in all areas, as mentioned above. This ensures that the bipolar plates are electrically isolated from each other by means of the intermediate membrane electrode assembly, which in turn allows for avoiding any short circuit in the fuel cell stack.

In case the membrane electrode assembly overlaps the bipolar plate, a correct alignment of bipolar plate and membrane electrode assembly used to be very challenging. Consequently, an embodiment is preferred in which the fuel cell units are aligned by means of the distinctive alignment projections of the membrane electrode assemblies. Hence, the stacked fuel cell stack shows at least one protruding shape which is formed by the aligned distinctive projections of each membrane electrode assembly. Thanks to the distinctive alignment projections of the membrane electrode assemblies, the above mentioned difficulty has been overcome, as the fuel cell units may be aligned by means of the membrane electrode assembly, only, and not by contacting or aligning the bipolar plates.

In case the fuel cell stack is intended to be comprised in a housing it is further preferred if the housing has at least one side wall which has at least one recess for encompassing the distinctive alignment projection of the membrane electrode assembly. It is further preferred that the housing additionally acts as alignment tool, by providing at least one recess having a corresponding shape and/or size to the shape and/or size of the alignment projection of the membrane electrode assembly and consequently to the protruding shape and/or size of the stack formed by the aligned distinctive projections of each membrane electrode assembly.

Further advantages and preferred embodiments are disclosed in the claims, the description and the figures. It should be further noted that a person skilled in the art may regard or use the presented features individually or combine the presented features otherwise than indicated without extending the scope of the invention.

BRIEF DESCRIPTION OF THE DRAWINGS

In the following, the present invention will be described by means of embodiments shown in the figures. The shown embodiments are exemplarily, only, and are not intended to limit the scope of protection. The scope of protection is solely defined by the attached claims.

The figures show.

DETAILED DESCRIPTION

Figure 1:
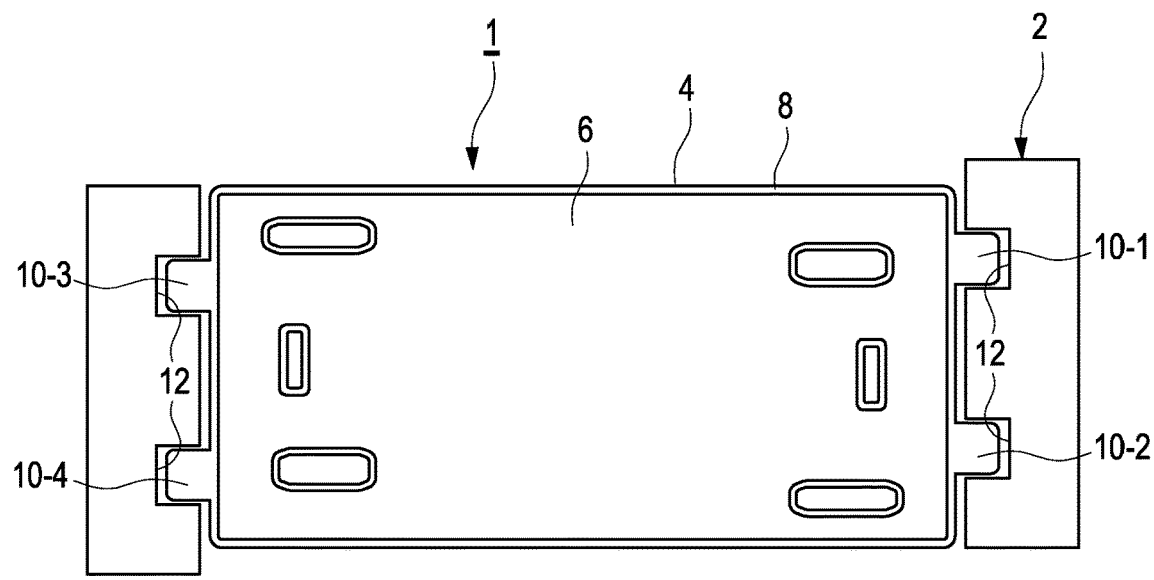
FIG. 1: a schematic view of a detail of an assembled fuel cell unit.

In the following same or similar functioning elements are indicated with the same reference numerals.

FIG. 1 shows a schematic view of a fuel cell unit 1 in an alignment tool 2, wherein the fuel cell unit 1 comprises a membrane electrode assembly 4 onto which a bipolar plate 6 is orientated. Preferably, the bipolar plate 6 has been fastened to the membrane electrode assembly 4 in a preceding preassembling step in which the membrane electrode assembly 4 and the bipolar plate are aligned and fastened to each other.

The aligning of the membrane electrode assembly 4 on one side of the bipolar plate 6 may be performed by any suitable alignment method. For example, it is possible using a camera or alignment structures, which provides a predetermined spatial orientation for the membrane electrode assembly 4 in relation to the bipolar plate 6, when the membrane electrode assembly 4 is placed on top of the bipolar plate 6 or vice versa. Of course, any other alignment procedure is also possible.

The fastening of the membrane electrode assembly 4 and the bipolar plate 6 may be performed by any suitable process, e.g. by welding, gluing, heat combining of thermoplastics, soldering etc., After the fastening, the spatial orientation of the membrane electrode assembly 4 and the bipolar plate 6 is fixed so that the subsequent alignment of the fuel cell units may be performed based on the alignment of the membrane electrode assembly 4, only.

As can bee seen from FIG. 1, the membrane electrode assembly 4 has a basic shape which substantially resembles the shape of the bipolar plate, but extends over the bipolar plate 6 all-around the circumference of the bipolar plate 6, so that the bipolar plates is surrounded by a rim 8 of the membrane electrode assembly material. This ensures a very good isolation between two fuel cell units 1 which are arranged on top of each other, since the corresponding bipolar plates 6 of two adjacent fuel cell units 1 are prevented from contacting each other by means of the intermediate membrane electrode assembly 4.

Even if it would be possible to use the rim 8 itself for aligning the fuel cell units 1, it is preferred to use at least one distinctive alignment projection 10, which significantly protrude from the basic shape of the membrane electrode assembly 4 and is arranged at the periphery of the membrane electrode assembly 4. In the depicted embodiment there are 4 distinctive alignment projections 10-1, 10-2, 10-3, and 10-4. These distinctive alignment projections 10 may have any suitable shape and/or size, but in the embodiment depicted in FIG. 1, there are 4 alignment projection 10-1, 10-2, 10-3, 10-4, which have the same shape and size and are symmetrically distributed along the periphery of the membrane electrode assembly 4. As can further be seen in FIG. 1, the distinctive alignment projections 10 are accommodated by correspondingly shaped recesses 12, which are provided in the alignment tool 2 or in case a housing accommodating the fuel cell stack acts as alignment tool 2 in the housing.

Figure 2:
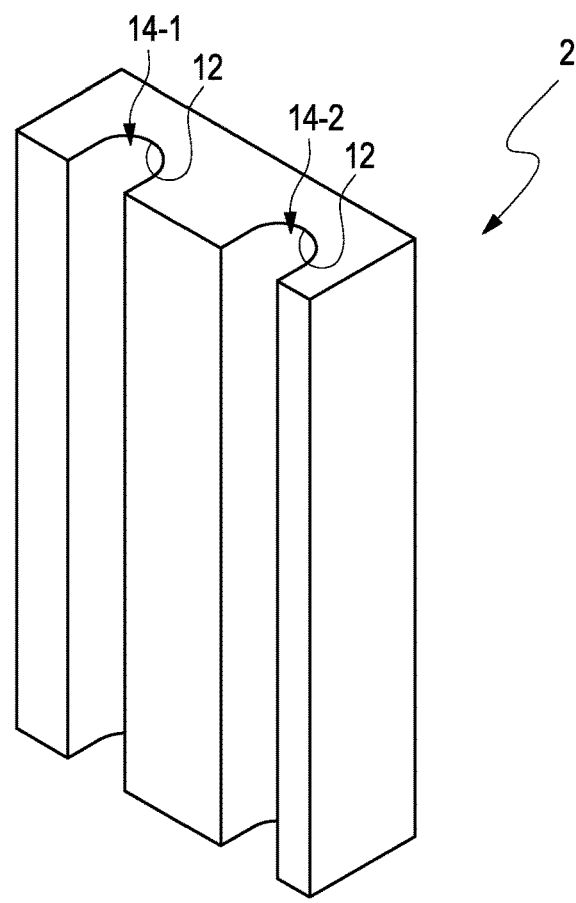
FIG. 2: a schematic view of housing which is adapted to accommodate a fuel cell stack.
Figure 3:
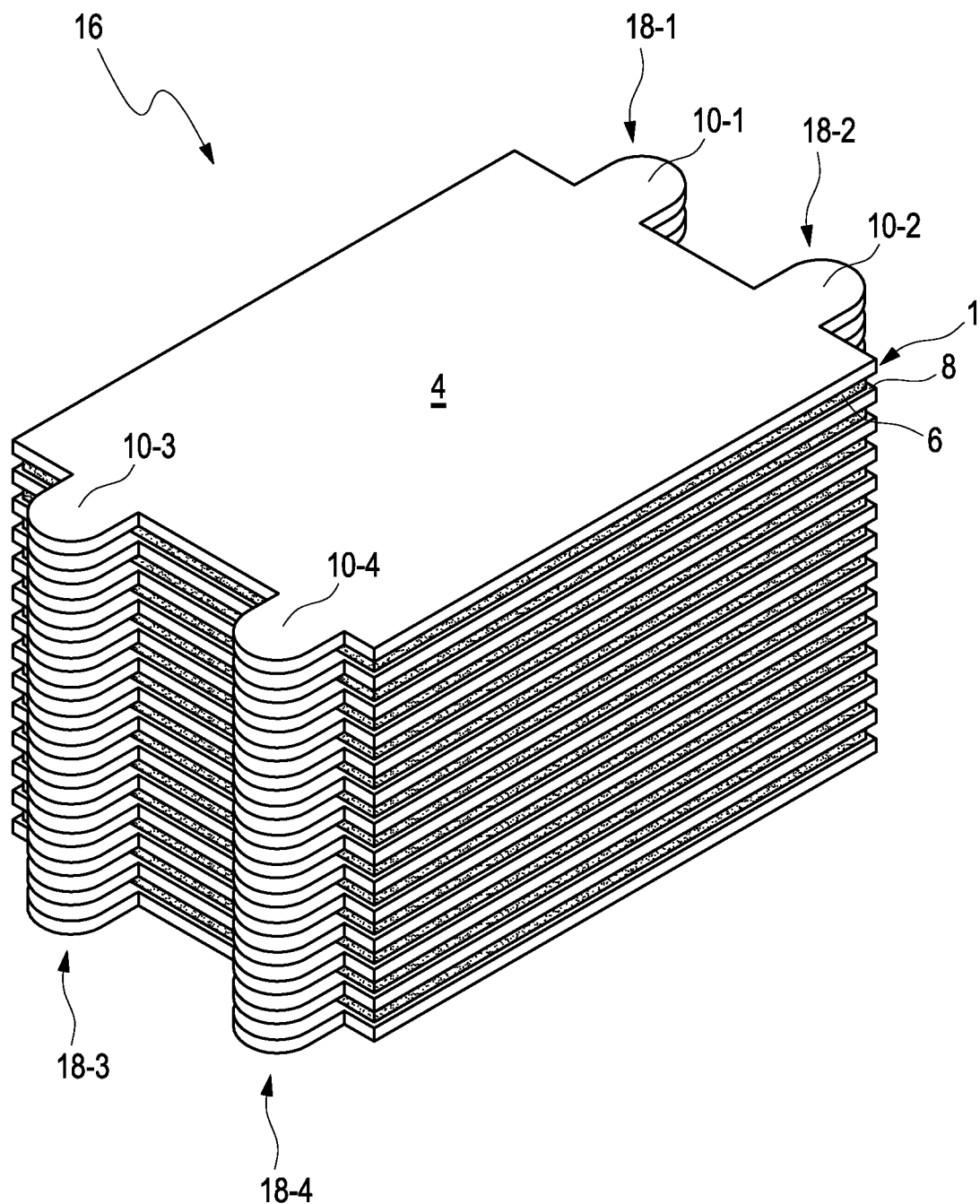
FIG. 3; a schematic view of an assembled fuel cell stack.

Such a housing or alignment tool 2 is shown in perspective view in FIG. 2. A can be seen, the housing/alignment tool 2 has recesses 12 which form in the depicted embodiment two elongated grooves 14-1 and 14-2, which are correspondingly shaped to the alignment projections 10. As can be seen in FIG. 3, in the stacked fuel cell stack 16, the alignment projections 10-1, 10-2, 10-3, 10-4 form rail-shaped extensions 18-1, 18-2, 18-3, 18-4, which may be accommodated by the grooves 14-1 and 14-2 of the housing/alignment tool 2.

Alternatively, the distinctive alignment projection 10 and the corresponding recesses 12, respectively, may have each a different shape and/or size and/or are asymmetrically distributed, which allows for a specific spatial and electric orientation of the membrane electrode assembly 4 during the stacking. Thereby, it is also ensured that the cathodes side of the membrane electrode assembly 4 contacts the cathode side of the bipolar plate 6 and the anode side of the membrane electrode assembly 4 contacts the anodes side of the bipolar plate 6, even if the membrane electrode assembly 4 and the bipolar plate 6 are not preassembled. Alternatively or additionally, this ensures that, in case the membrane electrode assembly 4 and the bipolar plate 6 are preassembled, the membrane electrode assembly 4 always contacts the bipolar plate 6 of the adjacent fuel cell unit and not the membrane electrode assembly 4 of the adjacent fuel cell unit. Consequently, the risk of manufacturing imperfections due to misalignment of both incorrect spatial orientation or incorrect electrical orientation may be reduced or even completely avoided.

It should be further noted that for using the membrane electrode assembly 4 or specifically the alignment projections 10 of the membrane electrode assembly for aligning the fuel cell units, not only the shape but also the size of the projections should be adapted to the intended function. This means that in case the membrane electrode assembly 4 is very thin and very flexible, the alignment projections may not be too big, for still ensuring a sufficient rigidity.

REFERENCE NUMERALS 1 fuel cell unit
2 alignment tool/housing
4 membrane electrode assembly
6 bipolar plate
8 rim
10 alignment projection
12 alignment recess
14 elongated groove
16 fuel cell stack
18 rail-shaped extension

The invention claimed is:

1. A fuel cell stack, comprising
a bipolar plate having a periphery with a basic bipolar plate peripheral shape, and
a membrane electrode assembly comprising at least a cathode, an anode and a membrane therebetween,
wherein the membrane electrode assembly further has a periphery with a basic membrane electrode assembly peripheral shape including at least four corners and at least four edges, one of the corners being disposed between each pair of edges of the at least four edges, the basic membrane electrode assembly peripheral shape of the membrane electrode assembly being substantially similar to the basic bipolar plate peripheral shape of the bipolar plate onto which the membrane electrode assembly is placed, wherein the membrane electrode assembly further comprises at least two distinctive alignment projections extending from at least two opposite ones of the four edges and disposed at a distance from any of the corners, the at least two distinctive alignment projections protruding from a circumference beyond the periphery of the basic shape of the bipolar plate beyond any portion of the periphery basic shape of the bipolar plate, wherein the bipolar plate has a fluid flow field.

2. The fuel cell stack according to claim 1, wherein the at least two distinctive alignment projections are distributed asymmetrically along the circumference of the membrane electrode assembly and/or have a different shape and/or size.

3. The fuel cell stack according to claim 1, further comprising a plurality of fuel cell units, wherein each fuel cell unit comprises a fuel cell unit membrane electrode assembly and a fuel cell unit bipolar plate, wherein the fuel cell units are stacked so that the membrane electrode assemblies are separated by bipolar plates, wherein at least one of the fuel cell unit membrane electrode assemblies is a membrane electrode assembly.

4. The fuel cell stack according to claim 3, wherein at least one fuel cell unit is a pre-assembled fuel cell unit having the fuel cell unit membrane electrode assembly which is fixed to the fuel cell unit bipolar plate by at least one fastening means.

5. The fuel cell stack according to claim 3, wherein a size of the fuel cell unit membrane electrode assembly extends over a size of the bipolar plate.

6. The fuel cell stack according to claim 3, wherein the fuel cell units are aligned by means of the distinctive alignment projections so that the stacked and aligned fuel cell stack has at least one protruding shape formed by aligned distinctive projections of the fuel cell unit membrane electrode assemblies.

7. The fuel cell stack according to claim 6, wherein the fuel cell stack is further encompassed by a housing having at least one side wall, wherein the at least one side wall further comprises at least one recess, which has a corresponding form to the at least one protruding shape of the fuel cell stack.

8. An alignment tool or fuel cell stack housing for aligning and stacking at least part of a fuel cell stack according to claim 3, wherein the alignment tool or fuel cell stack housing further comprises an aligning element having at least one recess which is adapted to accommodate the at least one distinctive alignment projection.

9. The alignment tool or fuel cell stack housing according to claim 8, wherein the at least one recess has a size and/or shape which corresponds to a size and/or shape of the at least one distinctive alignment projection.

10. The fuel cell stack according to claim 1, wherein the at least one distinctive alignment projection is integral with the membrane electrode assembly.

11. An arrangement, comprising
an alignment tool, and
a fuel cell stack, comprising
a bipolar plate having a periphery having a basic bipolar plate peripheral shape, and
a membrane electrode assembly comprising at least a cathode, an anode and a membrane therebetween,
wherein the membrane electrode assembly further has a periphery having a basic membrane electrode assembly peripheral shape which is substantially similar to the basic bipolar plate peripheral shape of the bipolar plate onto which the membrane electrode assembly is placed, wherein the membrane electrode assembly further comprises at least two distinctive alignment projections, at least two of the at least two distinctive alignment projections protruding in opposite directions beyond from a circumference the periphery of the basic shape of the bipolar plate beyond any portion of the periphery basic shape of the bipolar plate, and wherein the at least two distinctive alignment projections have a size and/or shape which is contacted by the alignment tool for aligning the membrane electrode assembly in the fuel cell stack, wherein the bipolar plate has a fluid flow field.

12. The arrangement according to claim 11, wherein the membrane electrode assembly comprises at least two distinctive alignment projections.

13. The arrangement according to claim 12, wherein the at least two distinctive alignment projections are distributed asymmetrically along the circumference of the membrane electrode assembly and/or have a different shape and/or size.

14. The arrangement according to claim 11, further comprising a plurality of fuel cell units, wherein each fuel cell unit comprises a fuel cell unit membrane electrode assembly and a fuel cell unit bipolar plate, wherein the fuel cell units are stacked so that the membrane electrode assemblies are separated by bipolar plates, wherein at least one of the fuel cell unit membrane electrode assemblies is a membrane electrode assembly.

15. The arrangement according to claim 14, wherein at least one fuel cell unit is a pre-assembled fuel cell unit having the fuel cell unit membrane electrode assembly which is fixed to the fuel cell unit bipolar plate by at least one fastening means.

16. The arrangement according to claim 14, wherein a size of the fuel cell unit membrane electrode assembly extends over a size of the bipolar plate.

17. The arrangement according to claim 14, wherein the fuel cell units are aligned by means of the distinctive alignment projections so that the stacked and aligned fuel cell stack has at least one protruding shape formed by aligned distinctive projections of the fuel cell unit membrane electrode assemblies.

18. The arrangement according to claim 17, wherein the fuel cell stack is further encompassed by a housing having at least one side wall, wherein the at least one side wall further comprises at least one recess, which has a corresponding form to the at least one protruding shape of the fuel cell stack.

19. The arrangement according to claim 11, wherein the alignment tool comprises an aligning element having at least one recess which is adapted to accommodate the at least one distinctive alignment projection.

20. An arrangement, comprising
a fuel cell stack, comprising
a fuel cell stack housing comprising an aligning element having at least one recess,
a bipolar plate having a periphery having a basic bipolar plate peripheral shape, and
a membrane electrode assembly comprising at least a cathode, an anode and a membrane therebetween,
wherein the membrane electrode assembly further has a periphery having a basic membrane electrode assembly peripheral shape which is substantially similar to the basic bipolar plate peripheral shape of the bipolar plate onto which the membrane electrode assembly is placed, wherein the membrane electrode assembly further comprises at least two distinctive alignment projections, at least two of the at least two distinctive alignment projections protruding in opposite directions from a circumference beyond the periphery of the basic shape of the bipolar plate beyond any portion of the basic shape periphery of the bipolar plate, and wherein the at least two distinctive alignment projections have a size and/or shape which is contacted by the alignment element for aligning the membrane electrode assembly in the fuel cell stack, the alignment element accommodating the at least two distinctive alignment projections, wherein the bipolar plate has a fluid flow field.

* * * * *